(12) United States Patent
Conway et al.

(10) Patent No.: US 6,522,705 B1
(45) Date of Patent: Feb. 18, 2003

(54) PROCESSOR FOR DIGITAL DATA

(75) Inventors: Thomas Conway, Limerick (IE); Philip Quinlan, Longmont, CO (US)

(73) Assignee: STMicroelectronics N.V. (NL)

( * ) Notice: Subject to any disclaimer, the term of this patent is extended or adjusted under 35 U.S.C. 154(b) by 0 days.

(21) Appl. No.: 09/260,477

(22) Filed: Mar. 1, 1999

(51) Int. Cl.[7] .............................. H03D 1/00; H04L 27/06
(52) U.S. Cl. ...................... 375/341; 375/262; 375/265; 714/795
(58) Field of Search .................................. 375/341, 348, 375/265, 262; 714/795, 765, 770, 771

(56) References Cited

U.S. PATENT DOCUMENTS

| 5,521,945 A | | 5/1996 | Knudson | 375/341 |
| 5,961,658 A | * | 10/1999 | Reed et al. | 714/746 |
| 6,052,248 A | * | 4/2000 | Reed et al. | 360/53 |
| 6,185,173 B1 | * | 2/2001 | Livingston et al. | 369/59 |
| 6,188,735 B1 | * | 2/2001 | Soichi et al. | 375/341 |

OTHER PUBLICATIONS

Wood et al., "Viterbi Detection of Class IV Partial Response on a Magnetic Recording Channel", IEEE Trans. on Communications, vol. COM–34, No. 5, May, 1986.

* cited by examiner

Primary Examiner—Mohammad H. Ghayour
(74) Attorney, Agent, or Firm—Lisa K. Jorgenson; James H. Morris

(57) ABSTRACT

The invention provides an apparatus for decoding a coded digital data sequence. The apparatus includes a first Viterbi decoder of a first response type, a first filter and a second filter. The first and second filters are coupled to receive decoded sequences from the first Viterbi decoder. The first Viterbi decoder generates a first decoded sequence from the coded digital data sequence. The first and second filters generate respective first and second error signals in response to receiving the first decoded sequence. The first and second error sequences indicate differences between the first decoded sequence and second and third decoded sequences, respectively. The second and third decoded sequences are probable sequences produced by Viterbi decoders of respective second and third response types in response to receiving the coded digital data sequence.

17 Claims, 12 Drawing Sheets

```
minmax46 = (sel4_6 ? (sel4_5 ? efir_d6 : efir_d8) :
                     (sel5_6 ? efir_d8 : efir_d10))

typ46    = (sel4_6 ? (sel4_5 ? 4 : 3) : (sel5_6 ? 3 : 2))

sgn13_46 = (minmax13 < minmax46)

sel13_46 = ( bfir_d14 &  bfir_d6 &  bfir_d8 &  bfir_d10 &  sgn13_46) |
           (-bfir_d14 & -bfir_d6 & -bfir_d8 & -bfir_d10 & -sgn13_46)

minmax16 = (sel13_46 & minmax13 : minmax46)
typ16    = (sel13_46 ? typ13 : typ46)

emod     = sat(efir_d12 + (bfir_d14 ? (mode ? -(two>>2) : 0) :
                                      (mode ?  two>>2  : 0)))

sgn16_7  = (minmax16 < emod)

sel16_7  = ( bfir_d14 &  bfir_d12 &  sgn16_7) |
           (-bfir_d14 & -bfir_d12 & -sgn16_7)

minmax   = (sel16_7 ? minmax16 : emod)
typ      = (sel16_7 ? typ16 : 1)
esel     = (bfir_d14 ? (efir_d14 - minmax) : (minmax - efir_d14))
```

```
sgn1_2   = (efir < efir_d2)
sgn1_3   = (efir < efir_d4)

sel1_2   = (  bfir_d14 &   bfir_d2 &  sgn1_2) |
           (-bfir_d14 & -bfir_d2 & -sgn1_2)
sel1_3   = (  bfir_d14 &   bfir_d4 &  sgn1_3) |
           (-bfir_d14 & -bfir_d4 & -sgn1_3)
sel2_3   = (  bfir_d14 &   bfir_d4 &  sgn1_2_d2) |
           (-bfir_d14 & -bfir_d4 & -sgn1_2_d2)

minmax13 = (sel1_3 ? (sel1_2 ? efir     : efir_d2) :
                      (sel2_3 ? efir_d2 : efir_d4))

typ13    = (sel1_3 ? (sel1_2 ? 7 : 6) : (sel2_3 ? 6 : 5))

sel4_5   = (  bfir_d14 &   bfir_d8 &  sgn1_2_d6) |
           (-bfir_d14 & -bfir_d8 & -sgn1_2_d6)
sel4_6   = (  bfir_d14 &   bfir_d8 &  sgn1_3_d6) |
           (-bfir_d14 & -bfir_d8 & -sgn1_3_d6)
sel5_6   = (  bfir_d14 &   bfir_d10 &  sgn1_2_d8) |
           (-bfir_d14 & -bfir_d10 & -sgn1_2_d8)
```

PROCESSOR FOR DIGITAL DATA

BACKGROUND

The present invention relates generally to receiving and reconstructing digital signals.

To recover data from a magnetic disk, a head reads data stored on the disk as a stream of individual analog pulses. An analog to digital converter converts the pulses to reconstruct the digital data stream. Due to pulse interference and noise, the reconstructed data stream may contain errors.

To aid in the detection and correction of errors, data can be encoded prior to storing the data on the magnetic disk. Encoding provides additional information to a disk reader, which aids in detecting errors generated by analog to digital conversions.

In convolution encoding, each bit of the encoded data stream depends on several successive bits of the original data stream. Thus, the data stream subsequently produced by the analog to digital converter includes correlation information introduced by the encoding method. The analog to digital conversion may still result in errors due to noise and pulse interference, but the disk reader may employ the encoded correlation information to correct such errors. For example, the disk reader can employ a decoder that decodes the type of correlation information produced by the encoding. From the correlation information, the decoder can identify errors produced by the analog to digital conversion and generate a decoded digital data stream having fewer errors.

Conventional decoders use a Viterbi algorithm to decode the digital data sequence generated by convolution encoding. The Viterbi algorithm requires checking for correlations in long sequences of digital data. Thus, Viterbi decoders require substantial hardware and large memories, which can be costly.

The memory requirements of Viterbi decoders grow approximately exponentially with the size of correlations introduced during encoding. Thus, high data storage densities and/or high disk read rates generally require expensive Viterbi decoders with large memory and hardware needs.

SUMMARY

The original encoding of correlation information determines the type of Viterbi detector needed to decode the digital data sequences produced by analog to digital conversion. High storage densities and transmission densities can introduce additional correlations into the data. At high densities, one may need to account for such correlations by decoding with a Viterbi decoder, which is adapted to data having the additional correlations.

In a first aspect the invention provides an apparatus for decoding a coded digital data sequence. The apparatus includes a Viterbi decoder, a first filter and a second filter. The Viterbi decoder generates a decoded sequence from the coded digital data sequence. The first filter generates a first error signal in response to receiving the decoded sequence. The second filter generates a second, different error signal in response to receiving the decoded sequence.

In some embodiments, the Viterbi decoder has a first response type and the first and second error signals indicate differences between the first decoded sequence and second and third decoded sequences. The second and third decoded sequences correspond to probable sequences produced by Viterbi decoders having respective second and third responses. In some preferred embodiments, the first, second, and third responses may be the PR4, the EPR4, and the $(1-D^2)(2+D+0.5D^2)$ responses, respectively. The decoder may also include a correction module to correct the first decoded sequence to the probable sequence in response to an error signal from either the first filter or the second filter. The correction module may correct the decoded sequence in response to the probability of a difference between the decoded sequence and one of the probable sequences being maximal in a preselected time window.

In some embodiments, the first and second filters are connected to receive a signal from the Viterbi decoder, which indicates an error in the coded digital data sequence. The first and second filters generate the respective first and second error signals if the error belongs to a preselected class of error events. The preselected class may include more than three types of error events.

In a second aspect, the invention provides a decoder for digital signals. The decoder includes a Viterbi decoder, a subtractor, and a matched filter. The Viterbi decoder receives a coded input signal and produces a decoded digital signal from the coded input signal. The subtractor is coupled to receive the coded input signal and the decoded digital signal and to produce an error signal indicative of a difference between a coded version of the decoded digital signal and the coded input signal. The matched filter is coupled to receive and compare the decoded signal and the error signal and to produce an adjustment signal in response to determining that the error signal and the decoded signal correspond to different input signals. The adjustment signal indicates an error in producing the decoded signal from the input signal.

In some embodiments, the adjustment signal indicates a difference between the decoded digital signal and a second decoded digital signal that would be produced by a second Viterbi decoder for a different response. For example, the adjustment signal may indicate the probability that the second Viterbi decoder would generate the second decoded signal in response to receiving the coded input signal.

In some preferred embodiments, the first response is the PR4 response, and the second response is either the EPR4 response or the $(1-D^2)$ $(1+D+0.5D^2)$ response.

In some embodiments, the decoder also includes a correction module. The correction module receives the adjustment signal from the matched filter and corrects a decoding error in the first decoded digital signal in response to the adjustment signal. The correction module corrects a particular error when the particular error is the most probable error in a preselected time window.

In some embodiments, the matched filter compares the received error signal to three or more preselected types of error events.

In a third aspect, the invention provides a computer program product to decode an encoded data stream. The program product resides on a computer readable medium and includes instructions. The instructions cause a processor to decode a coded digital data sequence by a first Viterbi algorithm to produce a decoded sequence, to filter the decoded sequence to generate a first error signal, and filter the decoded sequence to generate a second, different error signal.

In some embodiments, the first and second error signals indicate differences between the decoded sequence and decoded sequences that correspond to probable sequences produced by Viterbi decoders having respective second and third response types.

In some embodiments, the program product further includes instructions for causing the processor to correct the decoded sequence to one of the probable sequences in response to one of the error signals. The instructions that cause the processor to correct may correct the decoded sequence in response to a difference between the decoded sequence and the one of the probable sequences being the most probable difference in a selected time window.

BRIEF DESCRIPTION OF THE DRAWINGS

Other objects, features, and advantages of the invention will be apparent from the following description in which:

FIGS. 6C–6D are tables listing logical and arithmetic equations that define the matched filter of the combined error detection unit of FIG. 5.

DESCRIPTION

Figure 1:
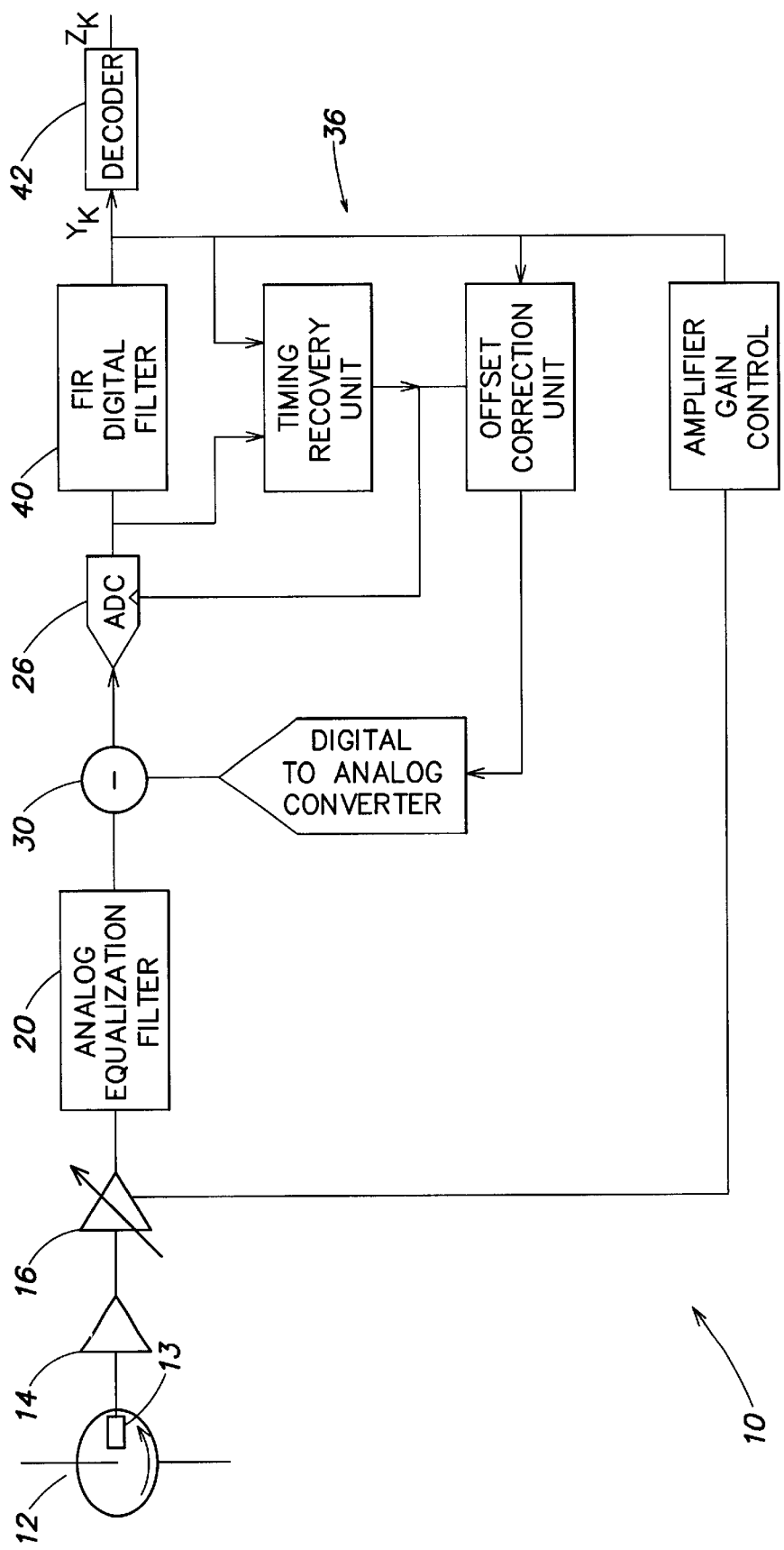
FIG. 1 shows a data recovery system for reading data from a magnetic disk and reconstructing a digital sequence from the data read from the magnetic disk.

Referring to FIG. 1, a data recovery system 10 that reads data from a magnetic disk 12 is shown. The disk 12 stores data coded according to a class 4 partial response (PR4) coding algorithm. The magnetic disk 12 rotates relative to a detecting head 13, which reads the data stored on the disk 12. The head 13 converts the read data into data pulses. For PR4 coding, the head 13 reads more than one bit of data during the length of a pulse for one bit. The head 13 sends the pulses to a preamplifier 14, to a variable gain amplifier 16 and then to an analog equalization filter 20. The equalizing filter 20 shapes the pulse sequence into pulses having a predetermined waveform characteristic.

Below recording bit densities of about 2.0 half height pulse widths (PW50), the analog equalizing filter 20 shapes the pulse sequence to the PR4 response. Between densities of about 2.2 and 3.0 PW50, the analog equalization filter 20 shapes the pulse sequence to either a $(1-D^2)(2+D+\{0.5\}D^2)$ response or a $1+D-D^2-D^3$ response, i.e. the EPR4 response. Here, D represents a temporal length of the pulse for one bit. Equalizing the analog pulses to these responses can increase signal to noise ratios for high recording densities.

The output signal from the analog equalization filter 20 is fed to a subtractor 30 to remove a DC offset component therefrom. The output signal from the subtractor 30 goes to an analog to digital converter (ADC) 26. The ADC 26 converts the signal into a digital sequence and sends the digital;sequence to a finite-impulse-response (FIR) digital filter 40. The FIR filter 40 compensates for frequency dependent phase shifts introduced by the analog equalizer filter 20 and produces an output digital sequence $Y_K$. The digital sequence $Y_K$ may differ from the coded sequence originally written to the disk 12 because of errors induced by noise and/or pulse interference.

The output sequence $Y_K$ goes to a decoder 42 and to a feedback loop 36. The feedback loop 36 controls the gain of the variable amplifier 16, removes DC offsets from the output signal of the equalization filter 20, and controls the timing of the ADC 26. The decoder 42 produces a final decoded digital signal as will be disclosed below.

Co-pending U.S. applications Ser. No. 09/207,245, entitled "Data Recovery System having Offset Compensation", and Serial No. 09/207,434, entitled "Data Recovery System", both filed on Dec. 8, 1998 by Thomas Conway, describe embodiments of the data recovery system 10. These applications are assigned to the same assignee as the present application and are incorporated by reference, herein, in their entirety.

Figure 2:
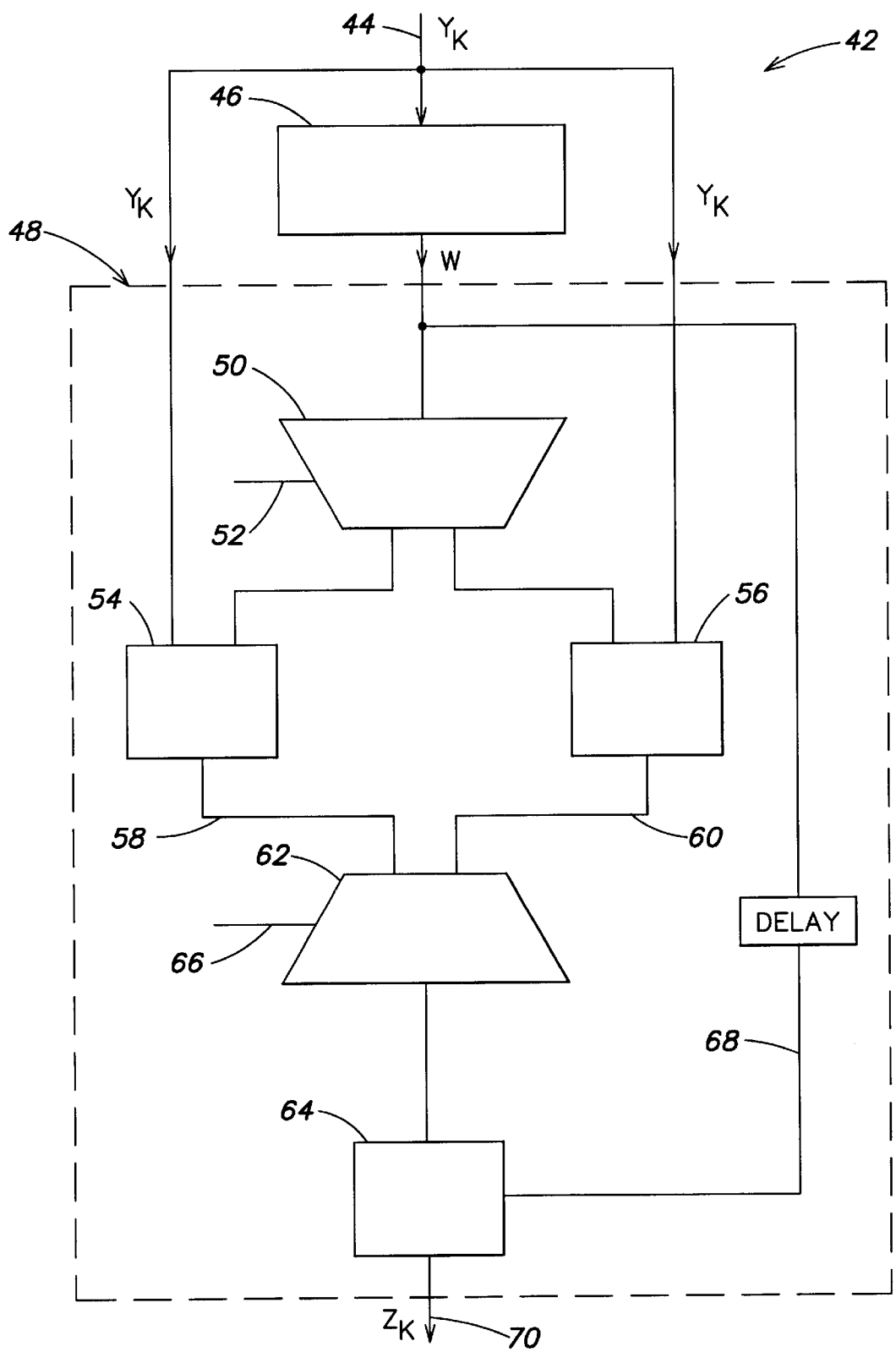
FIG. 2 shows a decoder, which provides substantially equivalent responses to first and second types of Viterbi decoders.

Referring now to FIG. 2, the decoder 42 receives the coded digital sequence $Y_K$ at input terminal 44 of a Viterbi decoder 46. The Viterbi decoder 46 has a response that matches the coding response of the data stored on the disk 12 shown in FIG. 1. For example, if the data stored on the disk 12 has been coded with the PR4 algorithm, the Viterbi decoder 46 is a PR4 Viterbi decoder.

The Viterbi decoder 46 produces a decoded digital sequence W representative of the original sequence Z, which was subsequently coded and stored on the disk 12. The decoded sequence W may differ from the original sequence Z due to errors induced by correlated noise in the analog signals of the recovery system 10 (FIG. 1). To correct these errors, the Viterbi decoder 46 sends the decoded digital sequence W to a post processor 48. The post processor 48 adjusts the sequence W to be the sequence that a Viterbi decoder for one of two preselected responses, having higher correlations, would produce.

For clarity, the remainder of the disclosure describes embodiments for which the Viterbi decoder 46 has the PR4 response.

The post processor 48 has two responses. Each response equals the response of the Viterbi decoder 46 times a factor. For the PR4 type Viterbi decoder 46, the factors are $(1+D)$ and $(2+D+\{0.5\}D^2)$. For these two factors, the decoder 42 provides the extended partial response class 4 (EPR4) response and the $(2+D-1.5D^2-D^3-0.5D^4)$ response, respectively. That is, the combination of the PR4 decoder 46 and the post processor 48 provides decoders substantially equivalent a full EPR4 Viterbi decoder and a full $(2+D-1.5D^2-D^3-0.5D^4)$ Viterbi decoder. For other response factors in the post processor 48, the decoder 42 would be substantially equivalent to Viterbi decoders with different responses.

A response may be represented by a vector where the vector's entries are the coefficients of the polynomial in D of the response. Powers of the polynomial increase from the left entry, starting at zero. For example, $\{2, 1, -1.5\}$ represents the $(2+D-1.5D^2)$ response.

The Viterbi decoder 46 transmits the decoded sequence W to a 1×2 multiplexer (MUX) 50. The MUX 50 selects the error processing response for the sequence W and is controlled by a select signal from a line 52. The MUX 50 sends the sequence W to either a first error detection unit 54 for the EPR4 response or to a second error detection unit 56 for the {2, 1, −1.5, −1, −0.5} response. Typically, the selection of the detecting unit 54, 56 depends on the recording density of the data on the magnetic disk 12 of FIG. 1. The first and second error detection units 54, 56 also receive the sequence $Y_K$ from the input terminal 44.

The error detection units 54, 56 produce error signals on lines 58, 60 indicative of whether the Viterbi decoder 46 correctly decoded the sequence $Y_K$ from input terminal 44. For each error detection unit 54, 56, the Viterbi decoder 46 is defined to have correctly decoded the sequence $Y_K$ if a Viterbi decoder with the response of the error detection unit 54, 56, would have decoded $Y_K$ to the same sequence W. The decoder 42 is substantially equivalent to full Viterbi decoders for these two responses, but is constructed from a PR4 Viterbi decoder 46 and appropriate first and second error detection units 54, 56. The user or a controller (both not shown) chooses the response by providing a select signal to the line 52 connected to the MUX 50.

The PR4 decoder 46 can also produce error signals identifying which bits of the sequence $Y_K$ were incorrectly recovered during prior analog to digital conversions in the recovery system 10 of FIG. 1. The error signals from the error detection units 54, 56 are used to correct the error signals produced by a PR4 decoder. The error signals from the error detection units 54, 56 indicate how to correct the decoded sequence W so that the corrected W sequence, i.e., a $Z_K$ sequence, is substantially the sequence that full Viterbi decoders with the EPR4 response or the {2, 1, −1.5, −1, −0.5} response would have produced. The decoder 42 uses a PR4 Viterbi decoder 46 and a post processor 48 to produce decoded sequences substantially equivalent to those produced by these more complex Viterbi decoders.

The error detection units 54, 56 transmit the digital error signals to input terminals of a 2×1 decoder 62. The 2×1 decoder 62 transmits a selected digital error signal to a correction module 64. The select signal for the MUX 50 also controls the select terminal 66 of the 2×1 decoder 62 so that the correction module 64 receives the error signal from the same error detection unit 54, 56, that received the decoded sequence W from the PR4 Viterbi decoder 46. The correction module 64 also receives the decoded sequence W from the PR4 decoder 46 via a line 68.

If the PR4 Viterbi decoder 46 incorrectly decoded the sequence $Y_K$, the correction module 64 corrects the sequence W. The correction module 64 uses the error signals from the error detection units 54, 56 to determine whether the PR4 Viterbi decoder 46 has decoded the sequence $Y_K$ correctly. The decoded sequence W is defined to be correct if a EPR4 Viterbi decoder or a {2, 1, −1.5, −1, −0.5} Viterbi decoder, as selected, would have produced the same sequence. The correction module 64 corrects decoding errors by modifying the bit patterns of W for which the probability of a decoding error is maximal. The correction module 64 transmits the corrected digital sequence $Z_K$ to line 70. The sequence $Z_K$ is substantially the same decoded sequence that a full EPR4 Viterbi decoder or a full {2, 1, −1.5, −1, −0.5} Viterbi decoder, as selected, would produce.

Figure 3A:
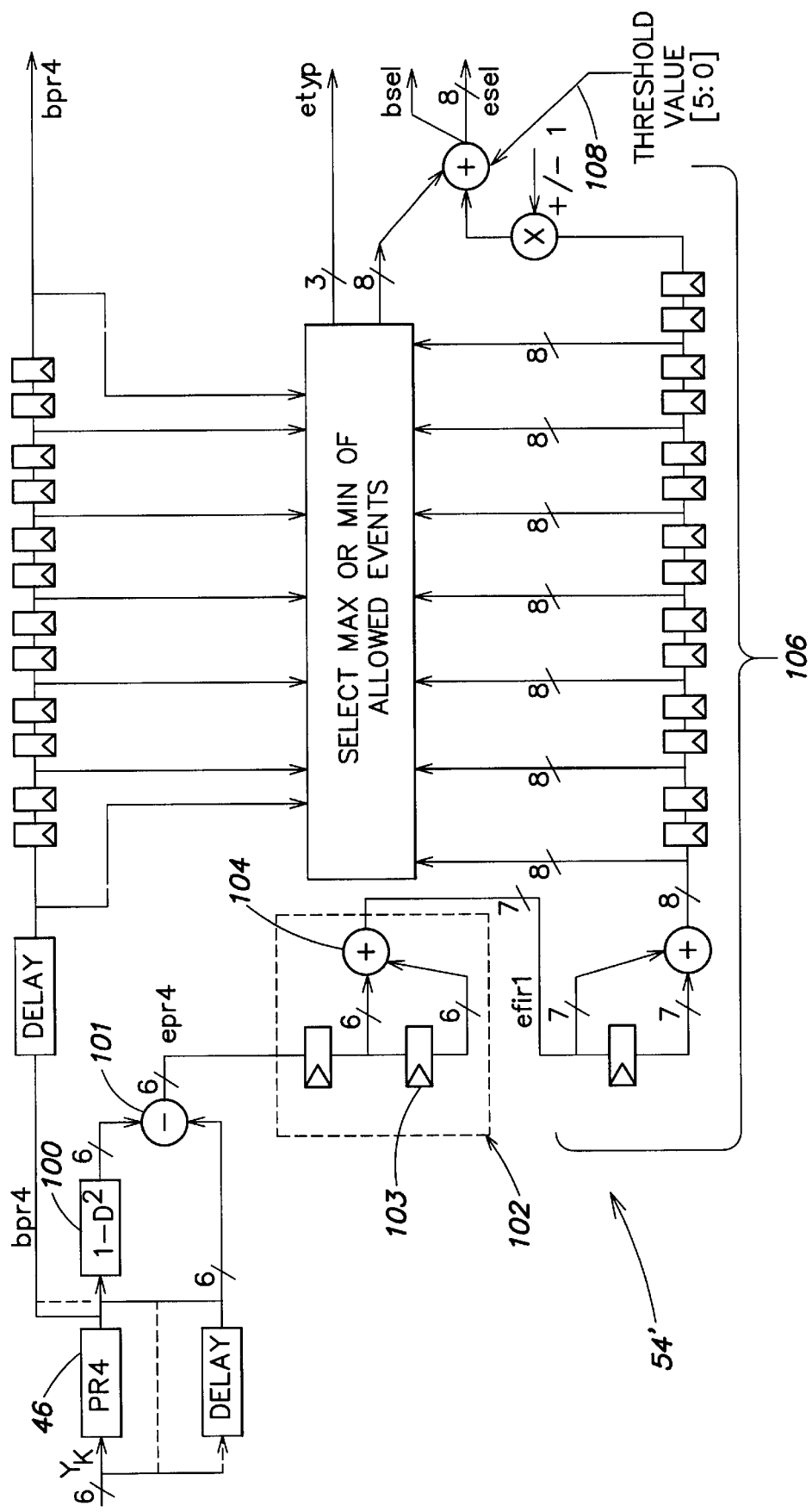
FIGS. 3A and 3B are implementations of the error detection units of FIG. 2 having the EPR4 and the $(1-D^2)(2+D+\{0.5\}D^2)$ responses, respectively.

Referring to FIG. 3A, an implementation 54' of the first error detecting unit 54 of FIG. 2 for the EPR4 response is shown. The error detecting unit 54' includes a filter 100 to re-encode a "bpr4" sequence, decoded by the PR4 decoder 46, according to the PR4 response. A subtractor 101 subtracts the input coded sequence "$Y_K$" from the re-encoded sequence to generate an error event sequence "erpr4". A filter 102 having the (1+D) response produces an error event sequence "efir1" encoded according to the full EPR4 response. The filter 102 has a register 103 and an adder 104 to multiply the "erpr4" sequence by a (1+D) response factor needed to encode the sequence with the full EPR4 response. From the "efir1" error sequence, a matched filter 106 detects relevant error events (see below Table 1).

In response to detecting a relevant error event, the matched filter 106 compares the "efir1" sequence to the decoded "bpr4" sequence. The matched filter 106 determines the probability that the PR4 Viterbi decoder 46 and a full EPR4 Viterbi decoder would decode the associated "bpr4" sequence differently. The matched filter 106 generates the "bsel" signal in response to relevant error events and also generates the "etyp" signal to indicate the error type. The matched filter 106 generates the "esel" signal to indicate the probability of a difference between how the PR4 and EPR4 decoders would decode the $Y_K$ sequence, if the probability is above a preselected threshold value. An input terminal 108 enables adjustments to the threshold value for detecting these decoding differences.

Figure 3B:
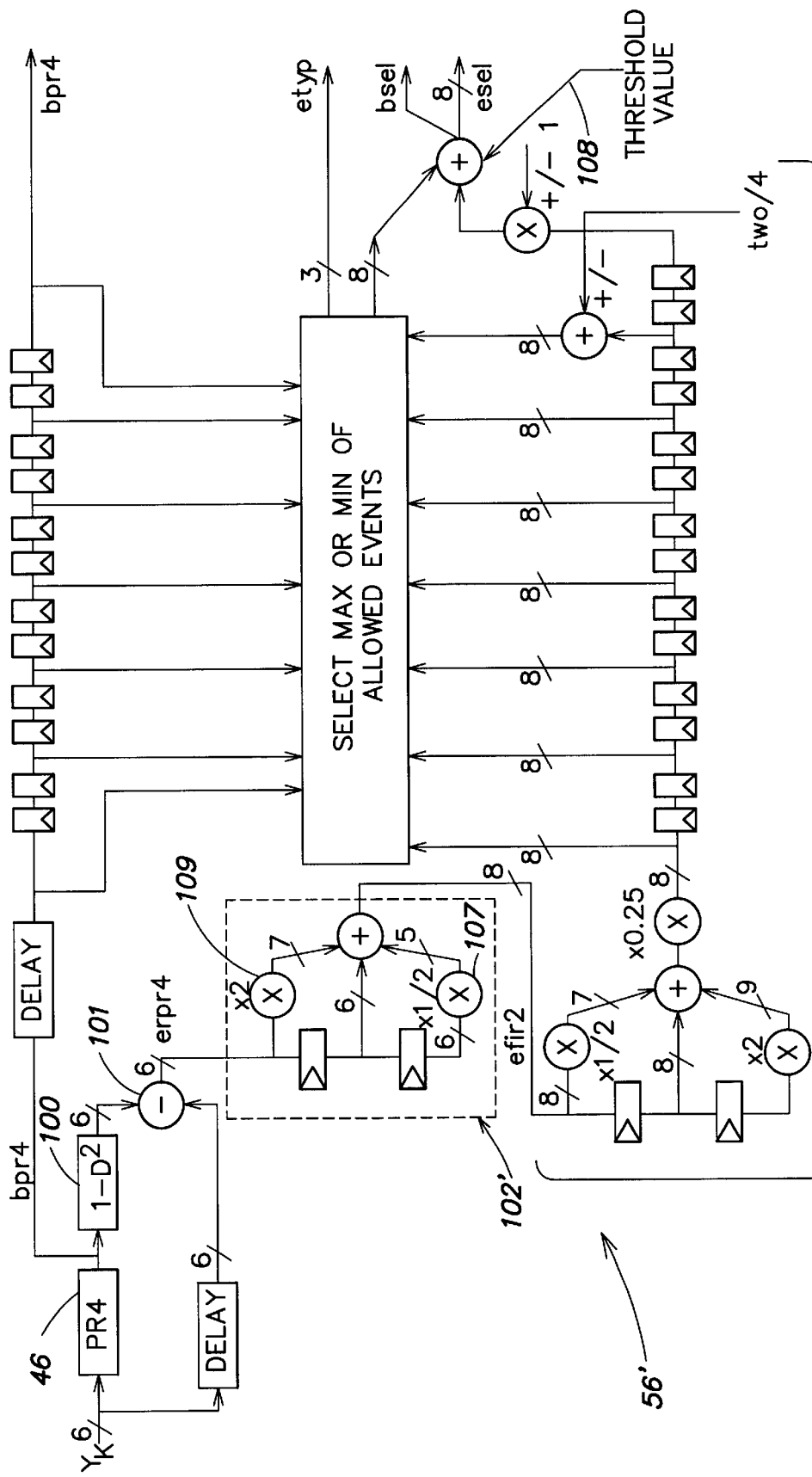

Referring to FIG. 3B, an implementation 56' of the second error detecting unit 56 of FIG. 2 for the {2, 1, −1.5, −1, −0.5} response is shown. The error detecting unit 56' includes a filter 102' having the {2, 1, 0.5} response to provide an error sequence "efir2" encoded according to the full {2, 1, −1.5, −1, −0.5} response. The filter 102' uses multipliers 107, 109, registers, and an adder to multiply the "erpr4" sequence by a $(2+D+\{0.5\}D^2)$ response factor and generate the "efir2" sequence. From the "efir2" sequence, a matched filter 106' detects relevant error events (see below Table 1).

In response to detecting a relevant error event, the matched filter 106' compares the "efir2" sequence to the decoded "bpr4" sequence. The matched filter 106' determines the probability that the PR4 Viterbi decoder 46 and a full {2, 1, −1.5, −1, −0.5} Viterbi decoder would decode the associated "bpr4" sequence differently. The matched filter 106' generates the "bsel" signal in response to relevant error events and also generates the "etyp" signal to indicate the error type. The matched filter 106' generates the "esel" signal indicating the probability of a difference between how the PR4 and {2, 1, −1.5, −1, −0.5) decoders would decode the $Y_K$ sequence if the probability is above the preselected threshold value at input terminal 108.

Referring to both FIGS. 3A and 3B, not all "bpr4" sequences can generate each type of "etyp" error event. Thus, checking for decoding errors associated with some error event sequences "efir1" or "efir2" is unnecessary for some "bpr4" sequences. In some embodiments, the matched filters 106, 106' reduce the number of comparisons by removing such non-allowed error sequences from consideration.

Figure 3C:
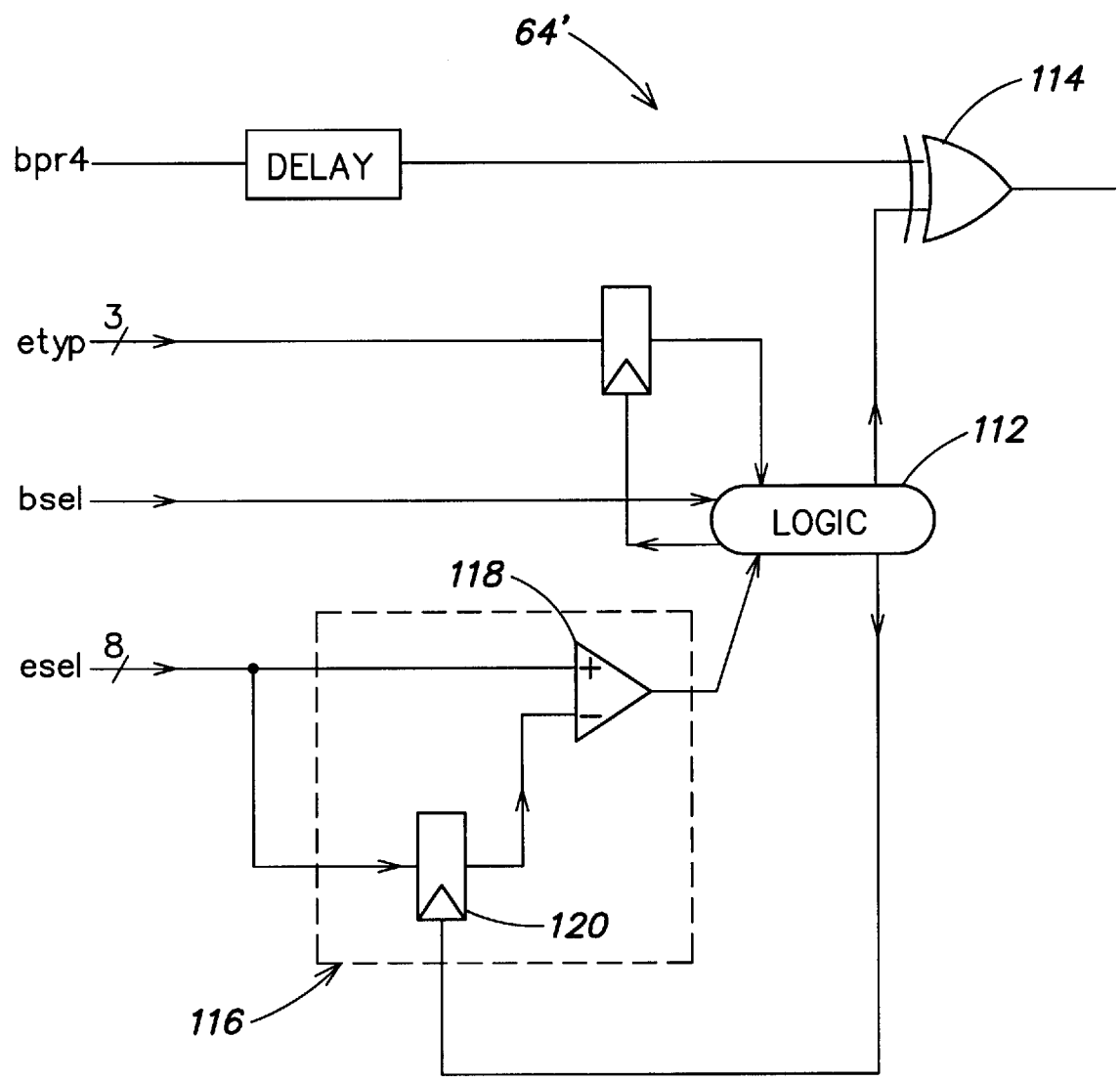
FIG. 3C is a circuit diagram of an implementation of the correction module of FIG. 2.

Referring now to FIG. 3C, an implementation 64' of the module 64, of FIG. 2 for correcting the decoded "bpr4" sequence using the "etyp", "esel", and "bsel" signals generated by the matched filters 106, 106' of FIGS. 3A and 3B is shown. The logic circuit 112 compares the "esel" values associated with "bpr4" sequences of each preselected time window. The "esel" values determine the probability that the associated "bpr4" sequences would be decoded differently by PR4 and the EPR4 or {2, 1, −1.5, −1, −0.5} Viterbi decoders, as appropriate. In each time window, the logic circuit 112 selects the "bpr4" sequence having the highest "esel" value. The selected "bpr4" sequence has the highest probability for being different than the sequence that either an EPR4 or a {2, 1, −1.5, −1, −0.5} Viterbi decoder, as appropriate, would have produced by decoding the sequence $Y_K$. The logic circuit 112 sends binary signals to the corrector 114, e.g., an exclusive OR-gate, to correct bits of the selected "brp4" sequence of the time window, which registers the most probable decoding error.

The correction module 64' employs an accumulator circuit 116 to store the largest "esel" value received in each time window. A comparator 118 compares successively received "esel" values to the "esel" value stored in a register 120, i.e. the previous largest "esel" value in the time window. If a larger "esel" value is detected by the comparator 118, the logic unit 112 replaces the "esel" value in the register 120 with the new larger value.

The correction module 64' enables correcting decoding errors when the probability of such an error is largest. The matched filter 106 may detect the same "etyp" error event during several successive time intervals. Thus, the matched filters 106, 106' detect possible errors without determining the best time to correct the "bpr4" sequence. The correction module 64' corrects the "etyp" error at a best time within each time window. The best time is the time when the "bpr4" sequence has the highest "esel" probability of differing from the decoded sequence that either the selected EPR4 or {2, 1, −1.5, −1, −0.5} decoder would produce. The correction module 64 compares the "esel" value for a time window and corrects a detected decoding error when the error has most probably occurred.

The error event sequence "erpr4" is a PR4 encoded form of a series of 0's, +2's, and −2's, which is equal to a difference of the binary coded sequences "$(1-D^2)^{-1}$ ypr4" and "bpr4". For example, a filtered sequence "$(1-D^2)^{-1}$ ypr4" of the form −1, −1, +1, −1, +1, and a decoded sequence "bpr4" of the form −1, +1, −1, +1, +1 produce a decoded error event sequence "er" of the form 0, −2, 2, −2, 0. The non-zero bits of the error event sequence "er" are bits of the sequence $(1-D^2)^{-1}$ ypr4 in which the PR4 Viterbi decoder 46 has found analog/digital conversion errors occurred. Non-zero bits occurred due to noise or pulse interference induced errors. After PR4 encoding, i.e. erpr4= $(1-D^2)$ (er), the sequence "erpr4" remains a series of zeros if errors due to noise or pulse interference did not occur during analog/digital conversions of the system 10.

For some error events, the PR4 Viterbi decoder 46 and either the full EPR4 or the full {2, 1, −1.5, −1, −0.5} Viterbi decoders have a higher probability of decoding the sequence $Y_K$ differently. Error event sequences for which the probability of a decoding difference is greater than a predetermined value are referred to as relevant error sequences. Simulations can determine the relevant set of error event sequences "erpr4" for which the PR4 decoder 46 is likely to decode $Y_K$ differently than a EPR4 or a {2, 1, −1.5, −1, −0.5} decoder as the case may be. Those of skill in the art know how to use simulation and modeling techniques to determine the relevant error sequences. The form of the relevant error sequences generally depends on the noise and pulse interference occurring in the head 13, analog equalization filter 20, analog/digital converter 26, and FIR filter 40 of FIG. 1, which produced $Y_K$.

Magnetic disks with recording densities between 2.2 and 3.0 PW50 can have seven potentially relevant "decoded" error sequences. The relevant "decoded" error sequences for the PR4 decoder 46 and either the EPR4 or the {2, 1, −1.5, −1, −0.5} Viterbi decoders are shown in Table 1.

TABLE 1

Relevant Error Sequences

| +2 | 0 | 0  | 0 | 0  | 0 | 0  | 0 | 0  | 0 | 0  | 0 | 0  | 0 |
|----|---|----|---|----|---|----|---|----|---|----|---|----|---|
| +2 | 0 | +2 | 0 | 0  | 0 | 0  | 0 | 0  | 0 | 0  | 0 | 0  | 0 |
| +2 | 0 | +2 | 0 | +2 | 0 | 0  | 0 | 0  | 0 | 0  | 0 | 0  | 0 |
| +2 | 0 | +2 | 0 | +2 | 0 | +2 | 0 | 0  | 0 | 0  | 0 | 0  | 0 |
| +2 | 0 | +2 | 0 | +2 | 0 | +2 | 0 | +2 | 0 | 0  | 0 | 0  | 0 |
| +2 | 0 | +2 | 0 | +2 | 0 | +2 | 0 | +2 | 0 | +2 | 0 | 0  | 0 |
| +2 | 0 | +2 | 0 | +2 | 0 | +2 | 0 | +2 | 0 | +2 | 0 | +2 | 0 |

The relevant error sequences, shown in Table 1, occur in digital data coded using a 16/17 {0, 6/6} modulation code. The modulation type limits the possible lengths of relevant error sequences, e.g., coding with 8/9 {0, 4/4} modulation code reduces the relevant error sequences to five of the above-listed events.

Figure 4:
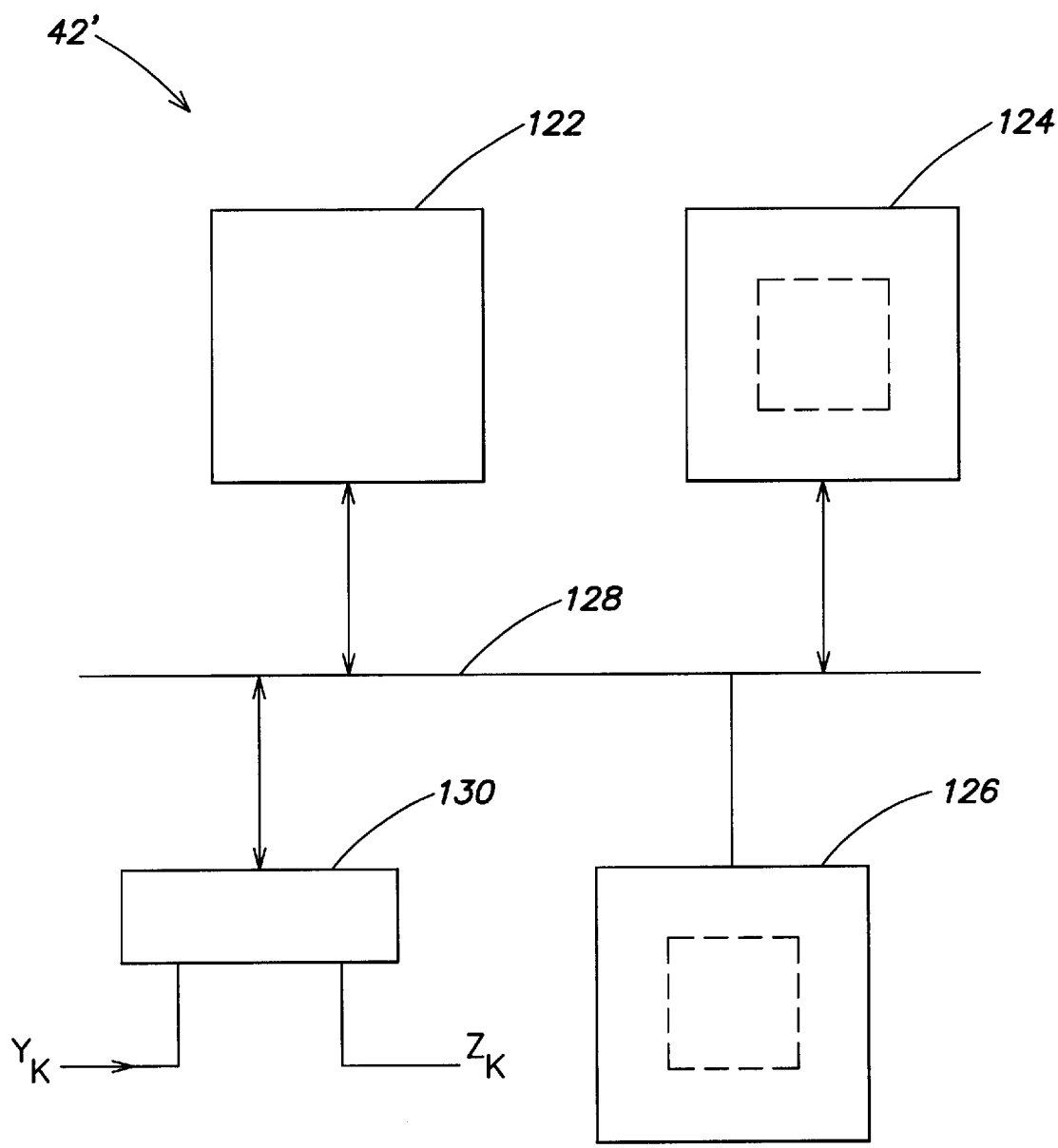
FIG. 4 is a programmed computer, which decodes digital data sequences substantially equivalently to first and second types of Viterbi decoders.

Referring now to FIG. 4, an alternate implementation of a decoder 42' as a computer program product including software instructions is shown. One example of a software embodiment uses the C-language program in the Appendix. The decoder 42' decodes the sequence $Y_k$ to produce the decoded sequence $Z_k$. The decoded output sequence $Z_k$ from this implementation is substantially equivalent to that produced, from the sequence $Y_k$, by a full EPR4 or {2, 1, −1.5, −1, −0.5} Viterbi decoder, as selected by the user.

The C-language program of the Appendix may be encoded in an active memory 124 of the decoder 42' or stored on a memory storage device 126. The storage device 126 may, for example, be a read only memory (ROM), a programmable read only memory (PROM), or an erasable programmable read only memory (EPROM). The decoder 42' also includes a processor 122 and a bus 128 coupling the memory 124 and the storage device 126 to the processor 122 and to an input/output interface 130. The processor 122 executes instructions from the memory 124. The input/output interface 130 receives the sequence $Y_K$ and sends the sequence to the processor 122. The processor 122 produces the decoded sequence $Z_K$ in response to receiving the sequence $Y_K$ by executing the C-language program of the Appendix from the memory 124.

Figure 5:
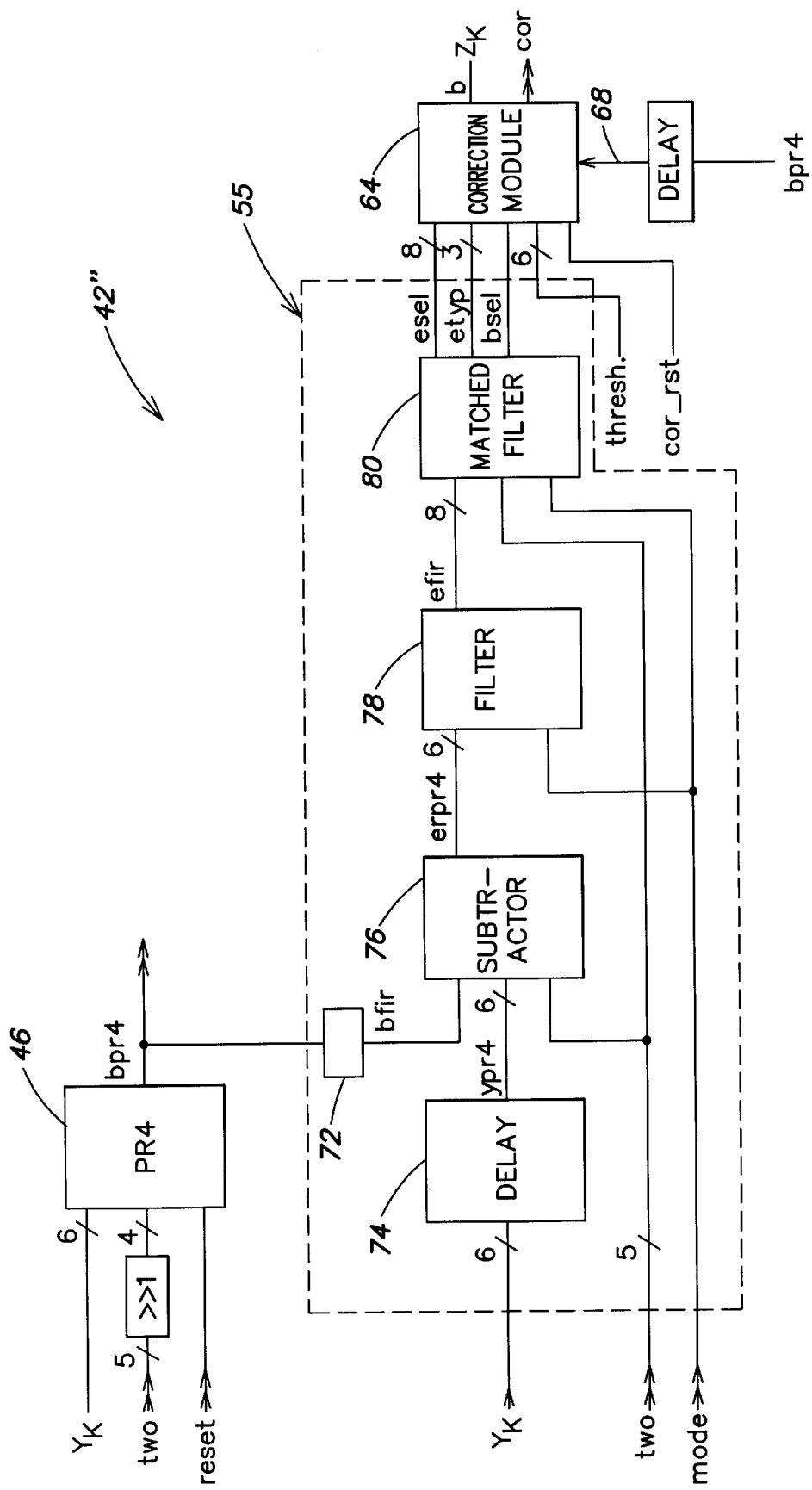
FIG. 5 is an alternate implementation of a decoder, which provides substantially equivalent responses to EPR4 and $(1-D^2)(2+D+\{0.5\}D^2)$ Viterbi decoders.

Referring now to FIG. 5, a hardware embodiment of a decoder 42" may be defined by the C-program of the Appendix. The decoder 42" includes a combined error detection unit 55 for either the EPR4 or the {2, 1, −1.5, −1, −0.5} response, as selected by a mode signal. The combined error detection unit 55 receives the sequence $Y_K$ and a decoded sequence "bpr4" produced by the PR4 Viterbi decoder 46. The PR4 Viterbi decoder 46 transmits the decoded sequence "bpr4" through a filter 72 with a response matching the response of the Viterbi decoder 46, i.e. the PR4 response. The filter 72 produces a sequence "bfir" coded with the PR4 response. The "bfir" sequence is the encoded version of the "bpr4" sequence produced by the PR4 Viterbi decoder 46 from the coded sequence $Y_K$. A time delay 74 delays the bit sequence $Y_K$ to produce the delayed sequence "ypr4". The delay 74 ensures that the sequences "ypr4" and "bfir" coincide at a subtractor 76. Both the "ypr4" and the "bfir" sequences are encoded according to the PR4 response.

The subtractor 76 produces the error event sequences "erpr4" by subtracting the $Y_K$ sequence from the "bfir" sequence. Since the "bpr4" sequence is the decoded sequence from the PR4 Viterbi algorithm, the PR4 decoder 46 has determined that the "bpr4" sequence is the original encoded digital sequence that led to the recovered $Y_K$ sequence. Thus, the sequence "erpr4" is an error event sequence encoded according to the PR4 Viterbi decoder 46.

A digital filter 78 receives the "erpr4" sequence from the subtractor 76. The filter 78 has a response adapted to convert "erpr4" sequences, coded with the PR4 response, into error event sequences "efir" encoded with either the EPR4 response or the {2, 1, −1.5, −1, −0.5} response. The filter 78 multiplies the "erpr4" sequence either by the response {1, 1}, i.e. (1+D), or by the (2, 1, −1.5, −1, −0.5} response as selected by the value of the "mode" input signal. The filter 78 also processes the "erpr4" sequence with a second filter that would otherwise be part of a matched filter 80. The matched filter 80 receives the "efir" sequences from the filter 78.

The matched filter 80 calculates the probability that the PR4 Viterbi decoder 46 and either a full EPR4 or a full {2, 1, −1.5, −1, −0.5} Viterbi decoder, as selected by the "mode" signal, would decode the sequence $Y_K$ differently. The matched filter 80 calculates a probability in response to detecting a "efir" sequence, which corresponds to one of the relevant error sequences of Table 1 after equivalent filtering.

The matched filter 80 generates several output signals for categorizing situations where the PR4 Viterbi decoder 46 and a full EPR4 or {2, 1, −1.5, −1, −0.5} decoder, as selected, would decode the data sequence $Y_K$ differently. The matched filter 80 generates a "bsel" signal to indicate whether the PR4 Viterbi decoder 46 and the EPR4 or {2, 1, −1.5,. −1, −0.5} Viterbi decoder, as selected, would have decoded the corresponding portion of the $Y_K$ sequence differently. The matched filter 80 generates a "etyp" signal to indicate the type of a relevant error event. Since there are seven relevant error events in Table 1, the "etyp" signal is three bits wide. The matched filter 80 generates a "esel" signal to indicate the probability that the PR4 Viterbi decoder 46 and either an EPR4 or a (2, 1, −1.5, −1, −0.5} decoder, as appropriate, would have decoded the corresponding portion of the $Y_K$ sequence differently. The correction module 64 receives the "esel", "etyp", and "bsel" signals and the associated sequence bpr4 from the PR4 decoder 46.

The correction module 64 adjusts the "bpr4" decoded data sequence produced by the PR4 Viterbi decoder 46 in response to the signals received from the combined error detection unit 55. The combined error detection unit 55 looks for preselected PR4 error event sequences "erpr4" to indicate which decoded sequences from the PR4 decoder 46 may need correction.

FIGS. 6A–6E show implementations of the combined error detection unit 55 and correction module 64 of FIG. 5, which together perform substantially equivalently to either a EPR4 Viterbi decoder or a {2, 1, −1.5, −1, −0.5} Viterbi decoder as selected by the "mode" input signal.

Figure 6A:
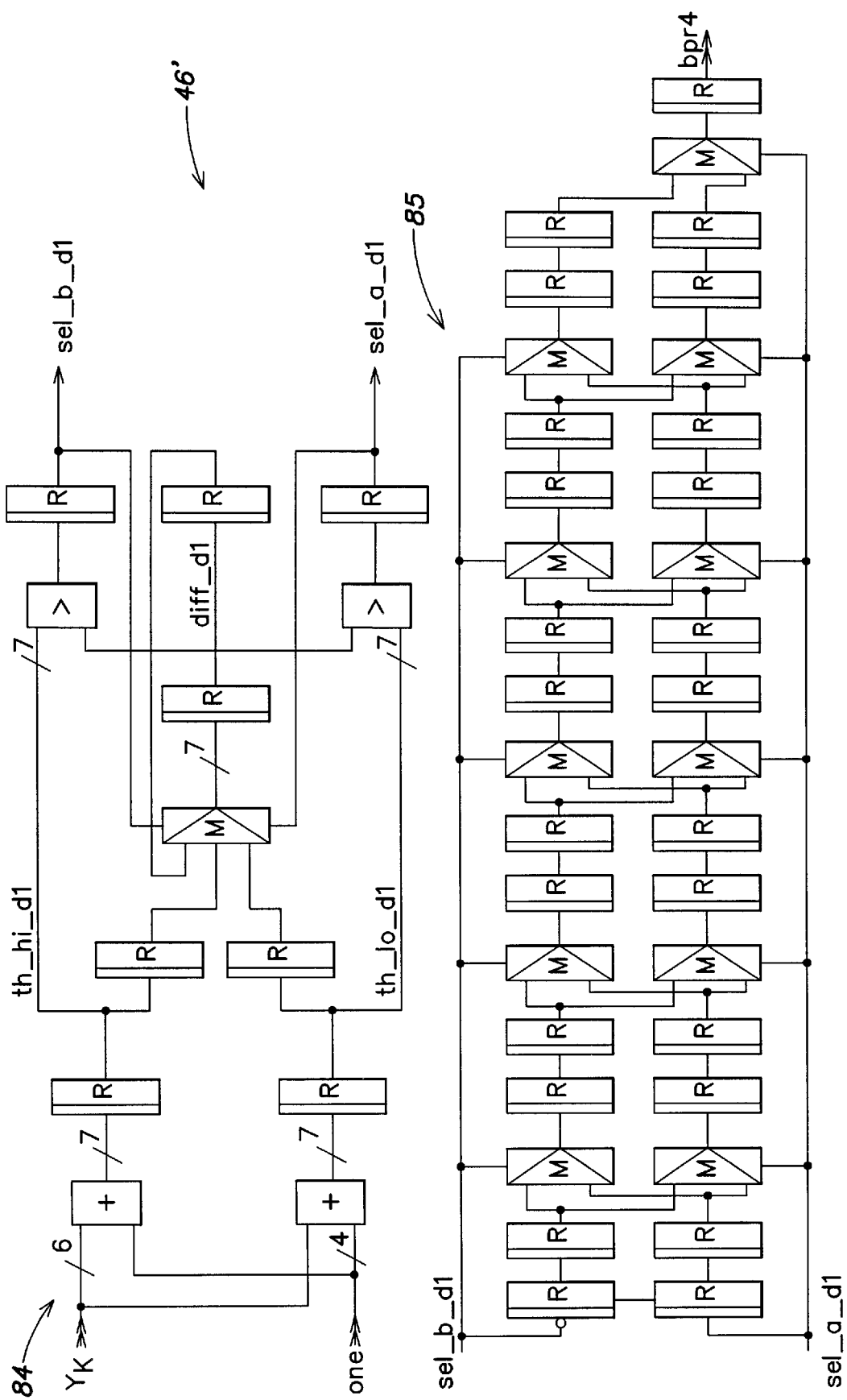
FIG. 6A is a circuit diagram of a PR4 Viterbi decoder shown in FIG. 5.

Referring to FIG. 6A, an implementation 46' of the PR4 Viterbi decoder 46 (FIG. 5), includes an add compare select circuit 84 and a path memory unit 85. The add compare select circuit 84 produces successive coding states from the sequence $Y_K$ using adders "+", greater-than comparators ">", and equality comparators "=". The path memory unit 85 uses a series of registers R and MUX's M to generate the "bpr4" sequence from the survivor states by implementing a PR4 trellis algorithm.

Figure 6B:
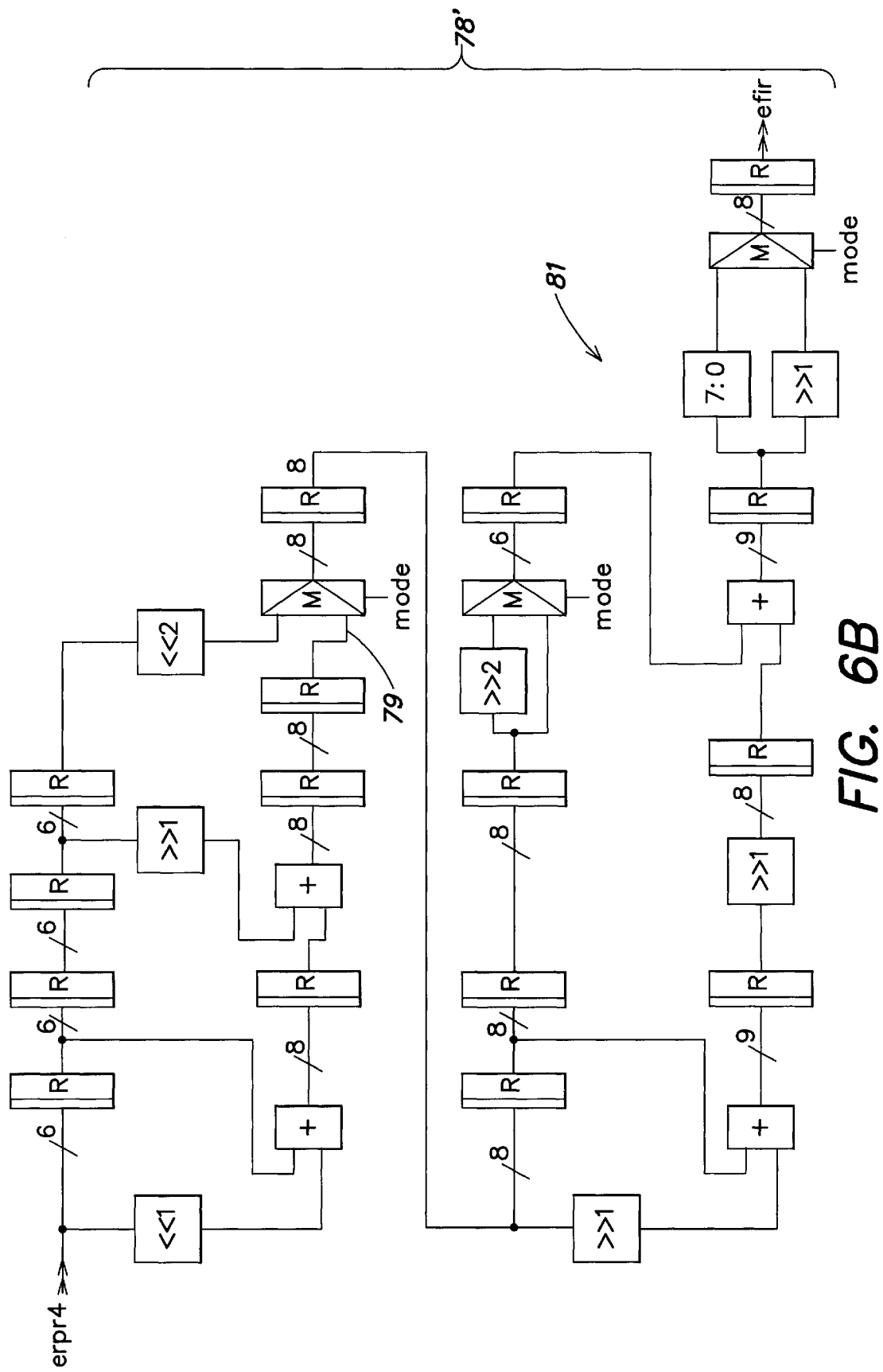
FIG. 6B is a circuit diagram of a filter used in the combined error detection unit of FIG. 5.

Referring to FIG. 6B, an implementation 78' of the filter 78 (FIG. 5) has the EPR4 or the {2, 1, −1.5, −1, −0.5} response, as determined by the mode input signal. The filter 78' receives the "erpr4" sequence, which is PR4 coded, i.e. erpr4=({1−$D^2$}{bpr4}−$Y_K$). The filter 78' uses registers, adders, and right/left shifters (>>/<<) to change the PR4 coded "erpr4" sequence to the EPR4 or {2, 1, −1.5, −1, −0.5} coded error sequence, as selected by the mode signal. For example, the line 79 transmits an error event sequence coded by the full {2, 1, −1.5, −1, −0.5} response. The output sequence "efir" is processed by an additional common filter 81, which might otherwise be a part of the matched filter 80.

Referring to FIGS. 6C and 6D, logic equations 87 and 89, respectively, functionally define an embodiment of the matched filter 80 (FIG. 5) for the combined error detecting unit 55. The logic equations check for possible error event sequences, which a "bpr4" sequence could produce after encoding and filtering as discussed above.

Figure 6E:
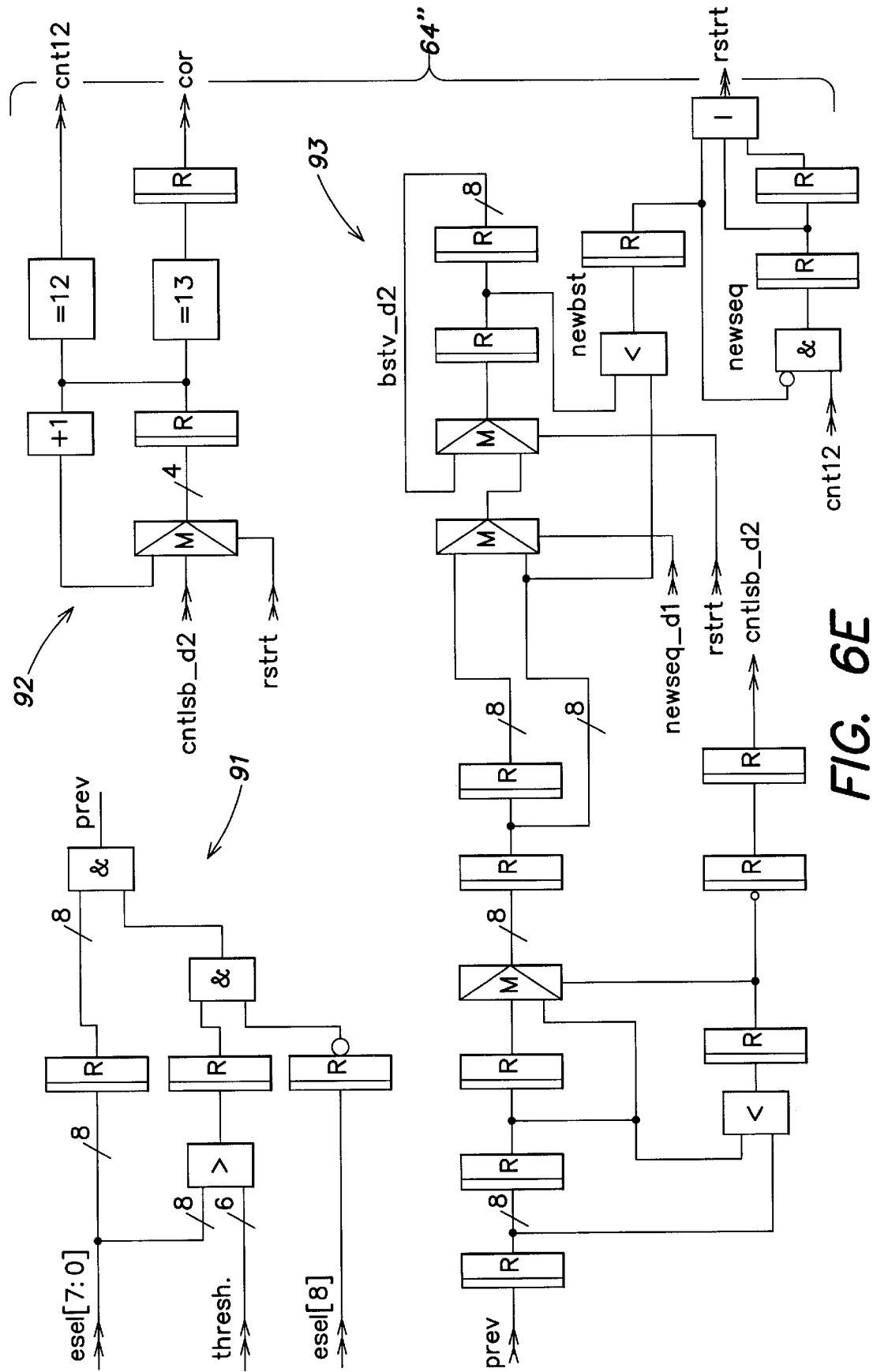
FIG. 6E is a circuit diagram of the correction module of FIG. 5.

Referring to FIG. 6E, an implementation 64" of the correction module 64 (FIG. 5) includes threshold qualifier circuit 91 coupled to a time window counter 92 and a maximum selection circuit 93. The threshold qualifier circuit 91 compares the "esel" signals corresponding to the "bpr4" sequence to a probability "thresh" to determine whether an above threshold probability of a decoding error exists. The threshold qualifier circuit 91 transmits a signal "prev" to the maximum selection circuit 93. The maximum selection circuit 93 indicates when the most probable error occurs in a selected time window. The time window counter 92 counts successive bits of a selected time window. For the illustrated embodiment, each time window is equal to the time to receive twenty-six successive bits of the "bpr4" sequence.

The correction module 64" identifies the "esel" value corresponding to the most probable occurrence of a decoding difference between PR4 and EPR4 or {2, 1, −1.5, −1, −0.5} decoders, as appropriate, in each time window. The correction module 64" chooses the "bpr4" sequence of each time window that the PR4 Viterbi decoder 46 has most probably decoded differently than either a full EPR4 or a full {2, 1, −1.5, −1, −0.5} decoder, as selected by the mode input signal in FIG. 5.

The correction modules 64' (FIG.3C) and 64" (FIG. 6E), correct the "bpr4" sequence having the largest "esel" value in each time window for receiving twenty-six successive data bits. If a new "esel" signal indicates a below threshold error event, the correction modules 64' 64" ignore the above threshold "esel" signals already accumulated in that time window. If the correction modules 64', 64" receive a "bsel" signal for an above-threshold "etyp" event, they compare the magnitude of the associated "esel" signal to the magnitude of the largest previously accumulated "esel" signal. If the newest event has a greater "esel" value, the correction module 64', 64" updates the identity of most probably incorrectly decoded sequence to be the "bpr4" sequence associated with the new "esel" value. In each time window, the correction modules 64', 64" correct the "bpr4" sequence for which PR4 Viterbi decoder and a EPR4 or {2, 1, −1.5, −1, −0.5} Viterbi decoder, as selected, would most probably decode the corresponding sequence $Y_K$ differently.

Other embodiments are within the scope of the following claims.

APPENDIX

This Appendix lists a C-language program for decoding the digital sequence Y (32 bit) according to the EPR4 or the $(1 - D^2) (1 + D + 0.5D^2)$ response.

```c
#include <stdio.h>
/*
*/
extern int index:
int Emax, Vmax, Tmax, Smax;
int postcode( int b ) {
        static int b0, b1, b2;
        b2 = b1; b1 = b0; b0 = b;
        return ( b2 ^b0);
}
int nbitturbo( int yin, int mode, int tresh, int two, /* inputs */
                                int *bdet, int *cor, int *erpr4, int *bpr4    /* outputs */
){
        static int ybuf[20], ybpos = 0;
        static int xreg;
        static int pr4e, pr4e1, pr4e2;
        static int terr, terr1, terr2 ;
        static int e7,e6,e5,e4,e3,e2,e1,e0:
        static int t7,t6,t5,t4,t3,t2,t1:
        static int besttype, bestval, bestcnt, abovetresh;
        static int cmask;
        int xhat,ypr4, yhatpr4, x7,x6,x5,x4,x3,x2,x1,x0:
        int Tmode, minmax, ertype, eventval;
        xhat = nbitdeint_pr4(yin,(two>>1));        /*** PR4 detector ***/
                                /*** 0x PR4 mode only, calculate the bit and return ***/
                                /*** 10 Turbo [1.1] mode. ***/
                                /*** 11 Turbo [2,1,0.5] mode. ***/
        if ( (mode&2) == 0 ) {
            *bdet = postcode( xhat );
            return;
        } else if ( mode&2 ) {
            Tmode = mode &1;           /*** 0 => [1.1],    1 => [2,1,0.5] ***/
        } else {
            fprintf( stderr, "Undefined mode %X\n", mode );
        }
        xreg = (xreg<<1)|xhat;
        /*** Delay the PR4 data sample ***/
        ypr4 = ybuf[ybpos] ; ybuf[ybpos] = yin: ybpos = (ybpos+1)%14:
            /*** reconstruct the PR4 sample ***/
        switch( (xreg&1)| ( (xreg>>1)&2) ){
                case 0: yhatpr4 = 0 ;   break:   /*** 0_0 ***/
                case 1: yhatpr4 = +two ;  break:   /*** 1_0 ***/
                case 2: yhatpr4 = -two ;  break:   /*** 0_1 ***/
                case 3: yhatpr4 =   0 ;  break:    /*** 1_1 ***/
        }
        pr4e2 = pr4e1: pr4e1 = pr4e:
        pr4e = yhatpr4-ypr4:      /*** PR4 error seq ***/
        /*** make the pr4e error value 6 bits ***/
        if (( pr4e > 31)||(pr4e<-32)){
                printf ("Wrapround %d at %d Two = %d\n", pr4e, index, two );
                pr4e &= 63;
                if ( pr4e & 0x20 ) pr4e |= 0xFFFFFFC0;
        }
        *erpr4 = pr4e;     /*** update the error output ***/
        *bpr4 = xhat;             /*** update the PR4 bit before post coder ***/
        terr2 = terr1; terr1 = terr;
        terr = (Tmode?2*pr4e:0) + pr4e1 + (Tmode?(pr4e2>>1):pr4e2);
                e0 = t1; t1 = e1; x0 = (xreg&(1<<16))?1:0;
                e1 = t2; t2 = e2; x1 = (xreg&(1<<14))?1:0;
                e2 = t3; t3 = e3; x2 = (xreg&(1<<12))?1:0;
                e3 = t4; t4 = e4: x3 = (xreg&(1<<10))?1:0;
                e4 = t5; t5 = e5; x4 = (xreg&(1<< 8))?1:0;
                e5 = t6; t6 = e6; x5 = (xreg&(1<< 6))?1:0;
                e6 = t7; t7 = e7; x6 = (xreg&(1<< 4))?1:0;
                e7 = (Tmode?(terr>>1):terr)+terr1+(Tmode?2*terr2:0);
                e7 = (Tmode?(e7>>2):e7);      /*** scale depending on mode ***/
                if ( abs(e7) > Smax) Smax = abs(e7); /*** for debuging ***/
                if (( e7 > 127)||(e7 < -128)){ /*** make e7 8 bits ***/
                     printf("E7 %d at %d Two = %d\n", e7, index, two );
                     e7 &= 255;
                     if ( e7 & 0x80 ) e7 |= 0xFFFFFF00;
                }
                    /*** Now select the most likely VALID event ***/
                    /*** use x0 to determine polarity and x0..x6 ***/
                    /*** to determine if event is allowed        ***/
```

APPENDIX-continued

This Appendix lists a C-language program for decoding
the digital sequence Y (32 bit) according to the EPR4 or the
$(1 - D^2) (1 + D + 0.5D^2)$ response.

```
                    if ( x0 ) {
                        minmax = -e1+(Tmode?((two ) )>>2):0); ertype = 1;
                        if ( (x1)&(-e2 > minmax) ) { minmax = -e2; ertype = 2; }
                        if ( (x1&x2)&(-e3 > minmax) ) { minmax = -e3; ertype = 3; }
                        if ( (x1&x2&x3)&(-e4 > minmax) ) { minmax = -e4; ertype = 4; }
                        if ( (x1&x2&x3&x4)&(-e5 > minmax) ) { minmax = -e5; ertype = 5; }
                        if ( (x1&x2&x3&x4&x5)&(-e6 > minmax) ) { minmax = -e6; ertype = 6; }
                        if ( (x1&x2&x3&x4&x5&x6)&(-e7 > minmax) ) { minmax = -e7; ertype = 7; }
                        minmax += e0;
                    }    else {
                        minmax = e1+(Tmode?((two ) )>>2):0); ertype = 1;
                        if ( (!x1)&&(e2 > minmax) ) { minmax = e2; ertype = 2; }
                        if ( ((!x1)&(!x2))&&(e3 > minmax) ) { minmax = e3; ertype = 3; }
                        if ( ((!x1)&(!x2)&(!x3))&&(e4 > minmax) ) { minmax = e4; ertype = 4; }
                        if ( ((!x1)&(!x2)&(!x3)&(!x4))&&(e5 > minmax) ) {minmax = e5; ertype = 5; }
            if ( ((!x1)&(!x2)&(!x3)&(!x4)&(!x5))&&(e6 > minmax) ) { minmax = e6;
            ertype = 6; }
            if ( ((!x1)&(!x2)&(!x3)&(!x4)&(!x5)&(!x6))&&(e7 > minmax) )
            { minmax = e7; ertype = 7; }
            minmax -= e0;
        }
eventval = minmax - tresh:          /*** Subtract threshold ***/
                                    /*** take 9 bit result ***/
                    if (( eventval > 255)||(eventval < -356)){
                        printf("eventval %d at %d Two = %d\n", eventval, index, two );
                        eventval &= 511;
                        if ( eventval & 0x100 ) eventval |= 0xFFFFFF00:
                    }
                    abovetresh = '(eventval&0x100);      /*** sgn is 0 => positive ***/
            /*** for debugging ***/
                    if ( abs(minmax-tresh) > Emax) Emax = abs(minmax-tresh);
                    if ( abs(minmax) > Tmax) Tmax = abs(minmax);
                    if ( abovetresh&&(abs(minmax-tresh) > Vmax)) Vmax = abs(minmax-tresh):
            /*** Now do maximum selection over +/- 13 bits ***/
                    bestcnt++;
                    if ( abovetresh && ( eventval > bestval ) ) {    /*** larger than current */
                        bestval = eventval;    /*** New value ***/
                        besttype = ertype;     /*** New type ***/
                        bestcnt = 0;           /*** reset counter ***/
                    }
                                /*** if no valid event goto wait state ***/
                    if ( besttype == 0 ){bestcnt = 0; bestval = 0; }
                    if ( bestcnt >= 13 ) { /*** do the correction ***/
                        cmask = 2*besttype;    /*** length of event ***/
                        printf(" pos %d correct type %d\n", index, besttype );
                        bestcnt = 0; besttype = 0;    /*** clear this event from future ***/
                        *cor = 1;
                    }    else *cor = 0;
                    if ( cmask != 0 ){      /*** still in a correction ****/
                        if ( (cmask&1)==0 ) { /*** each even slot ***/
                            xreg ^= (1<<29);    /*** correct the bit ***/
                        }
                        cmask--;
                    }
                    *bdet = postcode( (xreg0x80000000)?1:0 );
                    return;
            }
/*
        Finite Prec dicode viterbi
        For simulation purpose only.
        Hardware implementation should use difference metric implementation
*/
int nbitdeint_pr4( int y, int vONE )
{
        static int ma, mb, tma, tmb, 100.1p2.1m2:
        static long pa, pb, tpa, tpb;
        static long spa, spb;
        static int sma, smb:
        static int bout:
        100 = vONE:
        1p2 = y;
        1m2 = -y;
        if ( ma+100 > mb+1p2 ) { tma = ma+100; tpa = (pa<< 1)|1; }
                else { tma = mb+1p2; tpa = (pb<<1)|1; }
        if ( mb+100 > ma+1m2 ) { tmb = mb+100; tpb = (pb<<1)|0; }
```

APPENDIX-continued

This Appendix lists a C-language program for decoding the digital sequence Y (32 bit) according to the EPR4 or the $(1 - D^2) (1 + D + 0.5D^2)$ response.

```
            else { tmb = ma+1m2; tpb = (pa<<1)|0; }
    ma = tma−tmb: pa = tpa;
    mb = tmb−tmb: pb = tpb;
    bout = ( (pa&0x80)?1:0 );
    tma = ma; ma = sma; sma = tma;      /* Swap for deinterleaving */
    tmb = mb; mb = smb; smb = tmb;
    tpa = pa; pa = spa; spa = tpa;
    tpb = pb; pb = spb; spb = tpb;
    return bout;
}
```

A portion of the disclosure of this patent document contains material which is subject to copyright protection. The copyright owner has no objection to the facsimile reproduction by any-one of the patent disclosure, as it appears in the Patent and Trademark Office patent file or records, but otherwise reserves all copyright rights whatsoever.

What is claimed is:

1. An apparatus for decoding a coded digital data sequence, comprising:
    a Viterbi decoder to generate a decoded sequence from the coded digital data sequence;
    a first filter to generate a first error signal in response to receiving the decoded sequence; and
    a second filter to generate a second, different error signal in response to receiving the decoded sequence;
    wherein the Viterbi decoder has a first response type and the first and second error signals indicate differences between the decoded sequence and decoded sequences corresponding to probable sequences produced by Viterbi decoders having respective second and third response type; and
    a correction module to correct the decoded sequence to one of the probable sequences in response to receiving an error signal from one of the first and second filters.

2. The apparatus of claim 1, wherein the Viterbi decoder has a PR4 response.

3. The apparatus of claim 1, wherein the second response type is the EPR4 response and the first response type is the PR4 response.

4. The apparatus of claim 3, wherein the third response type is the $(1-D^2)(2+D+0.5D^2)$ response.

5. The apparatus of claim 1, wherein the correction module corrects the decoded sequence in response to a difference between the decoded sequence and the one of the probable sequences being the most probable difference in a selected time window.

6. The apparatus of claim 5, wherein the first and second filters are connected to receive a signal from the Viterbi decoder indicative of an error in the coded digital data sequence.

7. The apparatus of claim 6, wherein the first and second filters generate the respective first and second error signals in response to determining that the error belonging to a preselected class of error events.

8. The apparatus of claim 7, wherein the preselected class includes at least three types of error events.

9. The apparatus of claim 7, wherein the preselected class of error events is the set of allowed error events for decoded sequences from the Viterbi decoder.

10. A decoder for digital signals, comprising:
    a Viterbi decoder to receive a coded input signal and to produce a corresponding decoded digital signal from the coded input signal;
    a subtractor coupled to receive the coded input signal and the decoded digital signal and to produce an error signal indicative of a difference between a coded version of the decoded signal and the coded input signal; and
    a matched filter coupled to receive and compare the decoded signal and the error signal and to produce an adjustment signal in response to determining that the error signal and the decoded signal correspond to different input signals, the adjustment signal indicating an error in producing the decoded signal from the input signal;
    wherein the adjustment signal indicates a difference between the decoded digital signal and a second decoded digital signal that would be produced by a second Viterbi decoder for a different response type;
    a correction module to receive the adjustment signal from the matched filter and to correct an error in the first decoded digital signal in response to receiving the adjustment signal; and
    wherein the correction module corrects a particular error in the first decoded digital signal in response to particular error being the most probable error in a selected time window.

11. The decoder of claim 10, wherein the Viterbi decoder is a PR4 Viterbi detector.

12. The decoder of claim 10, wherein the adjustment signal indicates a probability that the second Viterbi decoder would generate the second decoded signal in response to receiving the coded input signal.

13. The decoder of claim 10, wherein the different response is the EPR4 response.

14. The decoder of claim 10, wherein the second response is the $(1-D^2)(1+D+0.5D^2)$ response.

15. The decoder of claim 10, wherein the matched filter is capable of comparing the error signal received to at least three preselected types of error events.

16. A computer program product for decoding an encoded data stream residing on a computer readable medium comprises instructions for causing a processor to:
    decode a coded digital data sequence by a first Viterbi algorithm to produce a decoded sequence;
    filter the decoded sequence to generate a first error signal; and
    filter the decoded sequence to generate a second, different error signal;

wherein the first and second error signals indicate differences between the decoded sequence and decoded sequences corresponding to probably sequences produced by Viterbi decoders having respective second and third response types;

further comprising instructions for causing the processor to correct the decoded sequence to one of the probable sequences in response to receiving one of the error signals; and wherein instructions that cause the processor to correct further comprise instructions to cause the processor to correct the decoded sequence in response to a difference between the decoded sequence and the one of the probable sequences being the most probable difference in a selected time window.

17. The product of claim 16, wherein the Viterbi algorithm is for the PR4 response.

* * * * *